July 14, 1931.  J. McCRACKEN  1,814,945
ELECTRIC MOTOR
Filed March 11, 1927  2 Sheets-Sheet 1
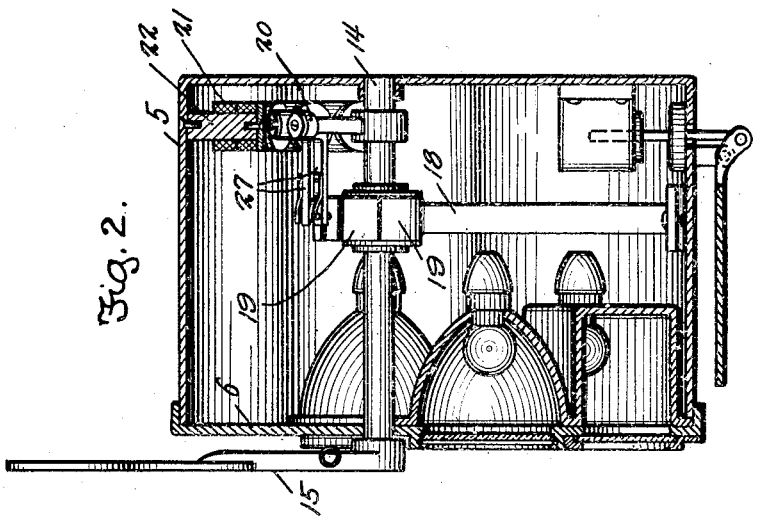
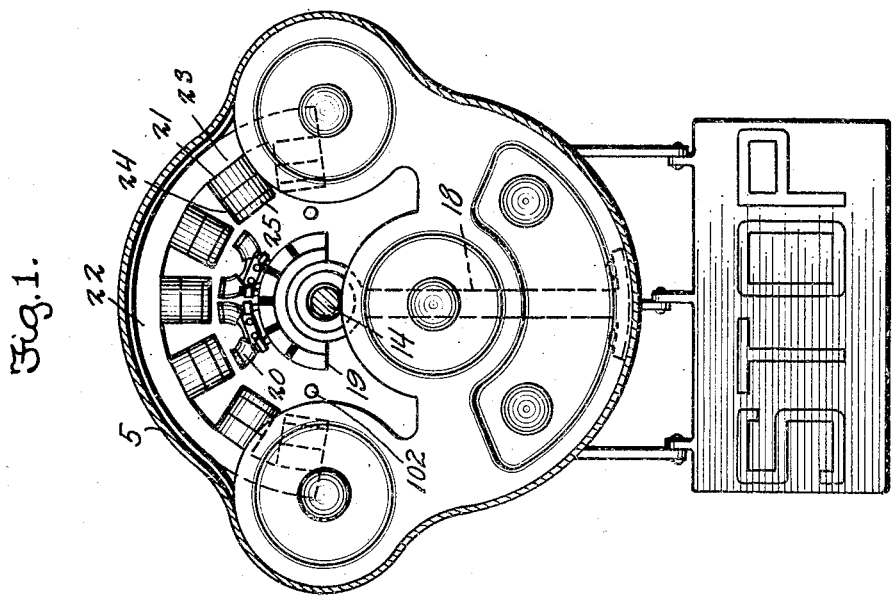
John McCracken Inventor

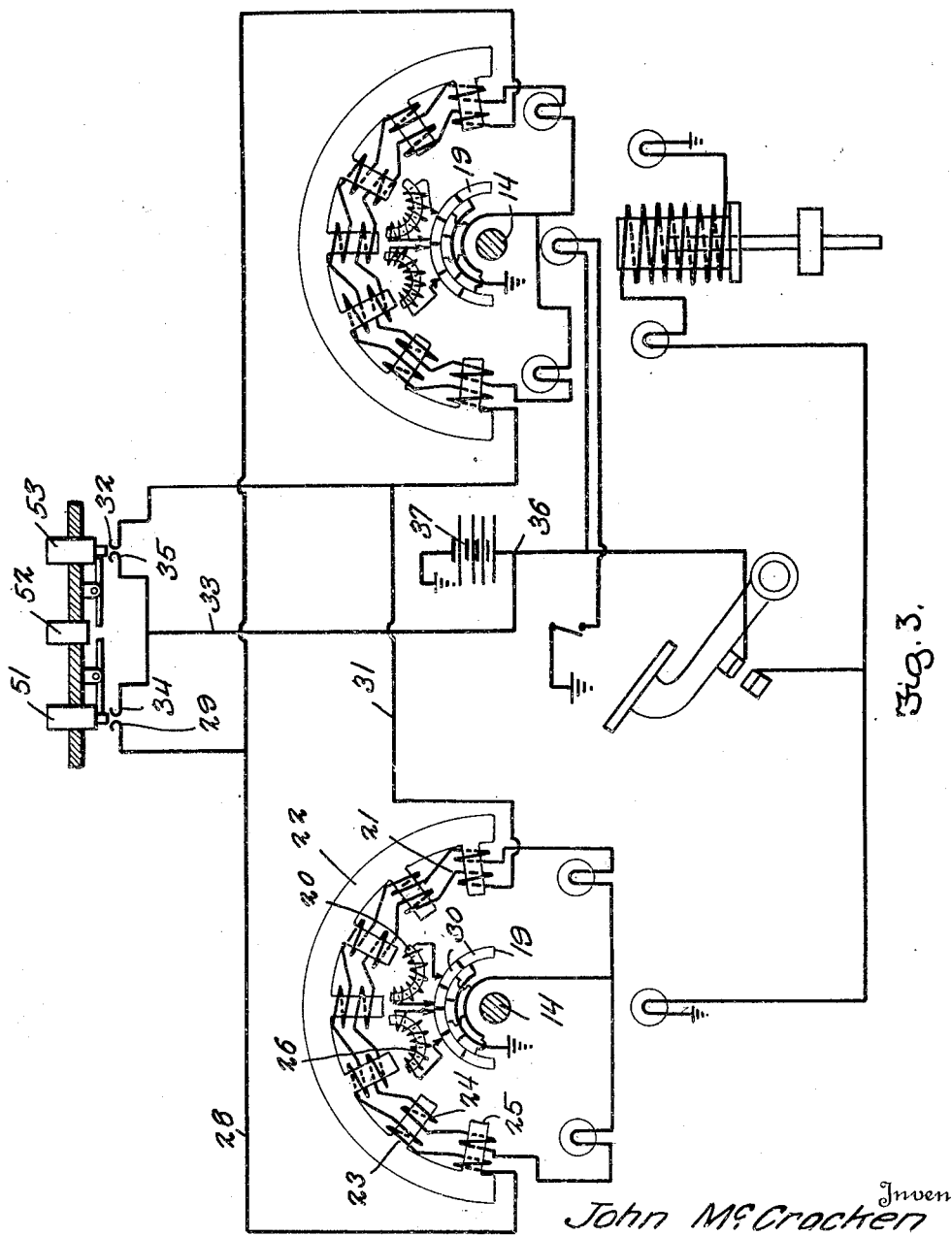

Patented July 14, 1931

1,814,945

UNITED STATES PATENT OFFICE

JOHN McCRACKEN, OF DAVENPORT, IOWA

ELECTRIC MOTOR

Application filed March 11, 1927. Serial No. 174,623.

This invention relates to electric motors and has for its object the production of a simple and efficient motor which will be caused to oscillate by the reverse of the polarity of the magnets forming a part of the motor.

Another object of this invention is the production of a simple and efficient motor which may be adapted for use in the actuation of automobile signals and the like.

Other objects and advantages of the present invention will appear throughout the following specification and claims.

Figure 1 is a vertical sectional view through the supporting casing within which the motor is mounted, the present illustration showing the motor adapted to an automobile signal casing, Figure 2 is a vertical sectional view through the casing shown in Figure 1, illustrating the mounting of the motor, Figure 3 is a diagrammatic view illustrating the various circuits, two motors being illustrated showing the circuits as they may be employed when adapting the motor construction to an automobile signal employing a front and rear signal.

The motor is provided with a shaft 14 shown for convenience in a casing 5, this showing being employed to illustrate one adaption of the motor to an automobile signal. The shaft 14 may have secured thereto the signal arm 15.

Positioned within the casing is a bracket 18 to which is rigidly connected a commutator 19 that encircles and has rotatably mounted therein the heretofore mentioned shaft 14. Rigidly secured to the shaft 14 to be radially disposed with relation thereto are a plurality of magnets 20 hereinafter known as the movable magnets to distinguish them from the annular series of stationary magnets 21 that are secured to the yoke 22 attached to the casing.

Each of the magnets 21 includes a pair of coils 23 and 24 that are wound in opposite directions so that upon passage of current therethrough the polarity of the poles or armatures 25 of the magnets may be changed and selectively in a manner now to be described. The windings 26 of the movable magnets are connected to brushes 27 bearing upon the commutator so that the energization thereof may be selectively controlled. The coils 23 are arranged in a circuit 28 that has one terminal connected to a contact 29 and its other terminal connected to alternate commutator segments 30 of the commutator. Upon passage of current through these coils 23 the magnetic device comprising the movable magnets will move to the right. This is brought about by the relation of the magnetic pole to the movable magnets and the stationary magnets which causes the magnetic device of the movable arm to be moved to the right.

The coils 24 are arranged in a circuit 31 that has one terminal connected to a contact 32 and its other terminal connected to alternate commutator segments 30. The magnetic device will be swung to the left upon energization of the coils 24.

For the purpose of supplying current to the heretofore mentioned circuits, I provide the conductor 33 connected to contacts 34 and 35 associated with the heretofore mentioned contacts 29 and 32, and this conductor 33 has its other terminal 36 attached to the usual storage battery 37.

The operation of the apparatus is as follows: When the push button 51 is depressed, the current flows from the positive pole of the battery 37 through wire 33, contact 34, contact 29, through wire 28 to the coils 23 of the magnets 21. These magnets 21 are wound right and left alternating, the first pole being positive, the second negative, and so on. Each coil has 100 turns of 26 gage magnet wire. The current will flow through the coils 23, to the first and third segments 30 of the commutator 19, thence by way of brushes 27 bearing on said segments 19 through coils 26 of the magnets 20. Each core of the magnets 20 has 400 turns of 26 gage magnet wire. These poles or magnets 20 are wound twice as strong as the field magnets 21, as the current is only one-half as great, being divided between the two coils wound upon the cores of the said stationary magnets. The current after flowing through the coils 26, flows to the second, fourth, and sixth segments 30 of the commutator 19 via brushes 27, thence to the ground, back to the negative pole of the battery 37. The current does not flow through coils 24 of the magnets 21 on account of the coils 24 not being grounded. Thus there is no circuit. Taking the armature in present position (Figure 3), it can be seen that the left pole of the left movable magnet 20 is negative, the second stationary magnet is negative, like poles repel, also the third field stationary magnet 21 is positive, unlike poles attract, therefore the armature revolves to the right, as soon as the left pole of the movable magnet 21 reaches the third field pole of the stationary magnet 21, the brushes 27 will have passed over to the third segments 30 of the commutator 19, reversing the current in the armature coil 26 of the movable magnet 20, which changes the left pole of the movable magnet from negative to positive, then said pole is repelled by the third stationary magnet 21 and the armature revolves to the left.

When push button 53 is closed, the current flows from the positive pole of the battery through wire 33, through contact point 35, thence through the push button 53 to contact point 32, thence via wire 31 to the coils 24 of the stationary magnets 21. These coils 24 are wound on the field cores 25, the same as the coils 23, but the current flows in opposite directions making the poles 25 magnetically opposite. The current flows from the coils 24 to the first, third and fifth segments 30 of the commutator 19, thence via brushes 27 through movable armature coils 26, thence through brushes 27 to the second, fourth and sixth segments 30 of the commutator 19, thence to the ground and back to the battery.

The armature poles of the movable magnets 20 are the same magnetically as when the button 51 was closed, but the field poles of the stationary magnets are of different polarity, therefore the armature revolves to the left.

Of course, it is to be understood that the magnetic devices may be designed, constructed and arranged in other relations than indicated and various other forms of signal devices may be associated therewith for operation to positions to give the proper indications and, therefore, I do not desire to be limited in any manner except as set forth in the appended claims.

I claim:—

1. In a motor of the oscillating type, an operating shaft, a series of stationary magnets arranged in arc-like formation around said shaft, each magnet including a double set of field windings oppositely wound for permitting a reversal of polarity, a series of movable magnets rigidly connected to said shaft and disposed for magnetic coaction with said first mentioned stationary magnets, a stationary commutator encircling said shaft in spaced relation with said movable magnets including insulated segments certain of which are electrically connected with the windings of the stationary magnets and others of which are grounded for controlling the travel of current to and from the stationary magnets, a switch means for controlling the polarity of said stationary magnets to cause said shaft to rotate in one direction, switch means for reversing the polarity of said stationary magnets and causing the shaft to operate in an opposite direction and means for rendering both of said mentioned switch means inactive, and means electrically connected to the movable magnets having brushes bearing upon said commutator.

2. An electric motor of the oscillating type comprising a shaft, a series of stationary magnets arranged about said shaft, each magnet having a plurality of oppositely wound field windings, a series of movable magnets carried by said shaft and disposed for magnetic coaction with said stationary magnets, a stationary commutator encircling said shaft in spaced relation with said movable magnets including insulating segments certain of which are connected with the windings of said stationary magnets and others of which are grounded for controlling the traveling of the current to and from the stationary magnets, switch means electrically connected to and controlling the passage of current through said field windings of said stationary magnets for reversing the polarity thereof, means for rendering said switch means inactive and means rigidly and electrically connected to the movable magnets having brushes bearing upon said commutator.

In testimony whereof I affix my signature.

JOHN McCRACKEN.